United States Patent Office 2,730,126
Patented Jan. 10, 1956

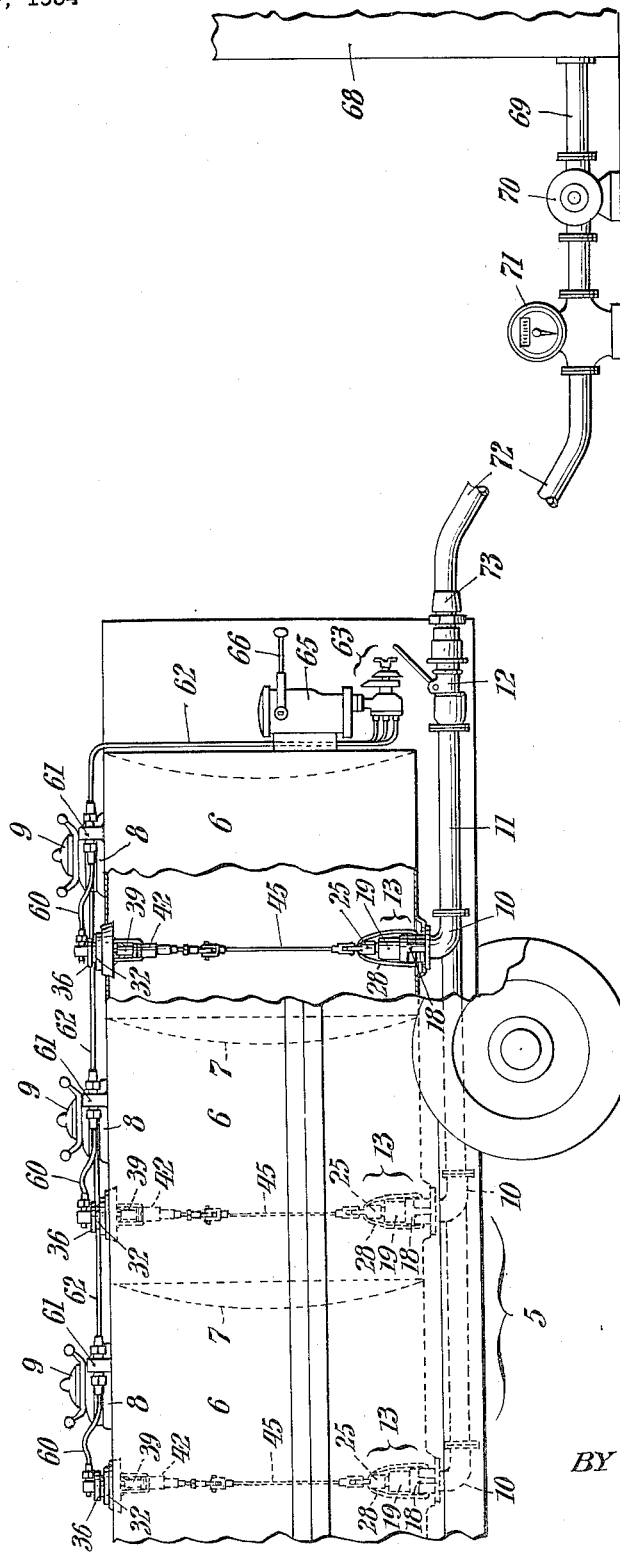

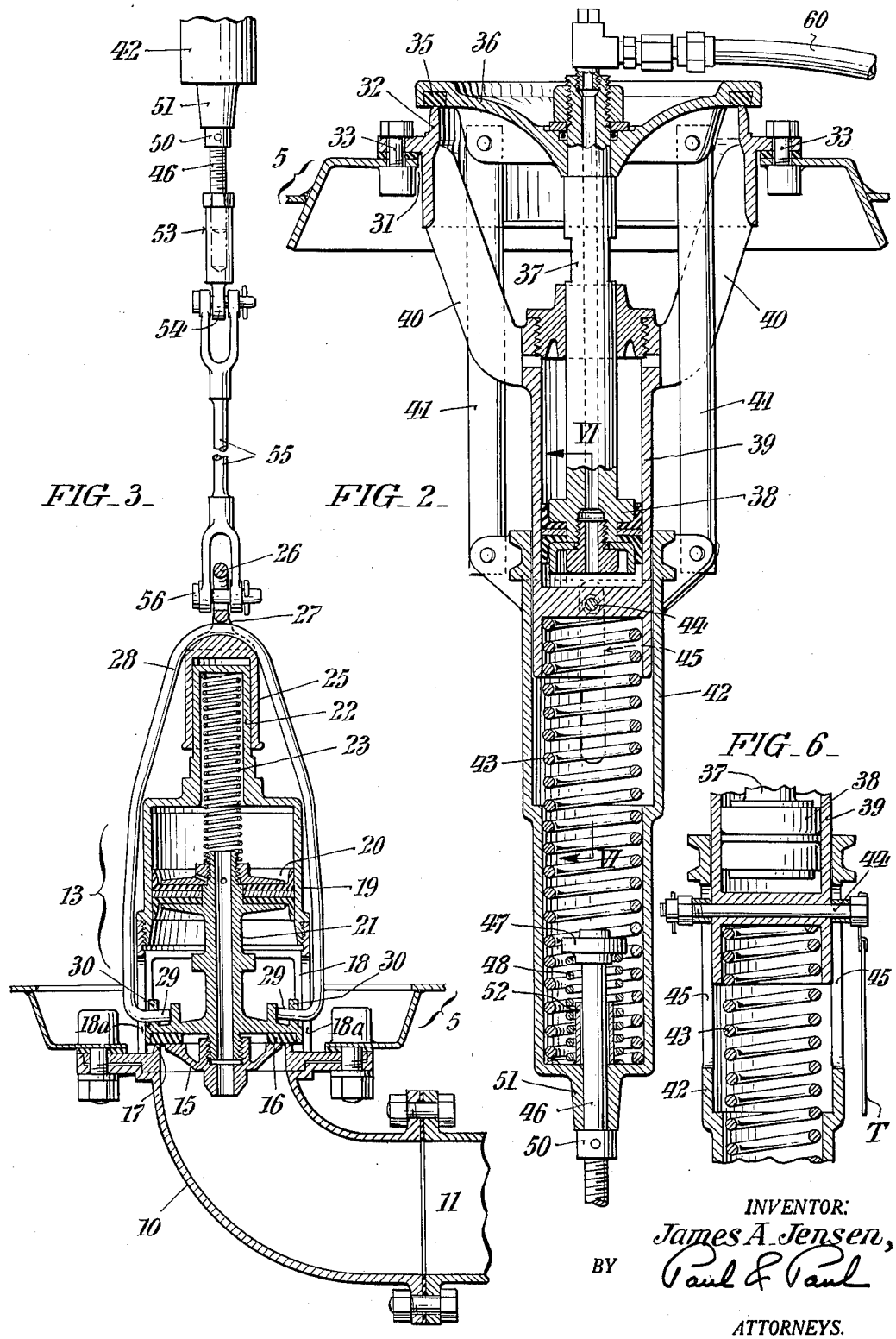

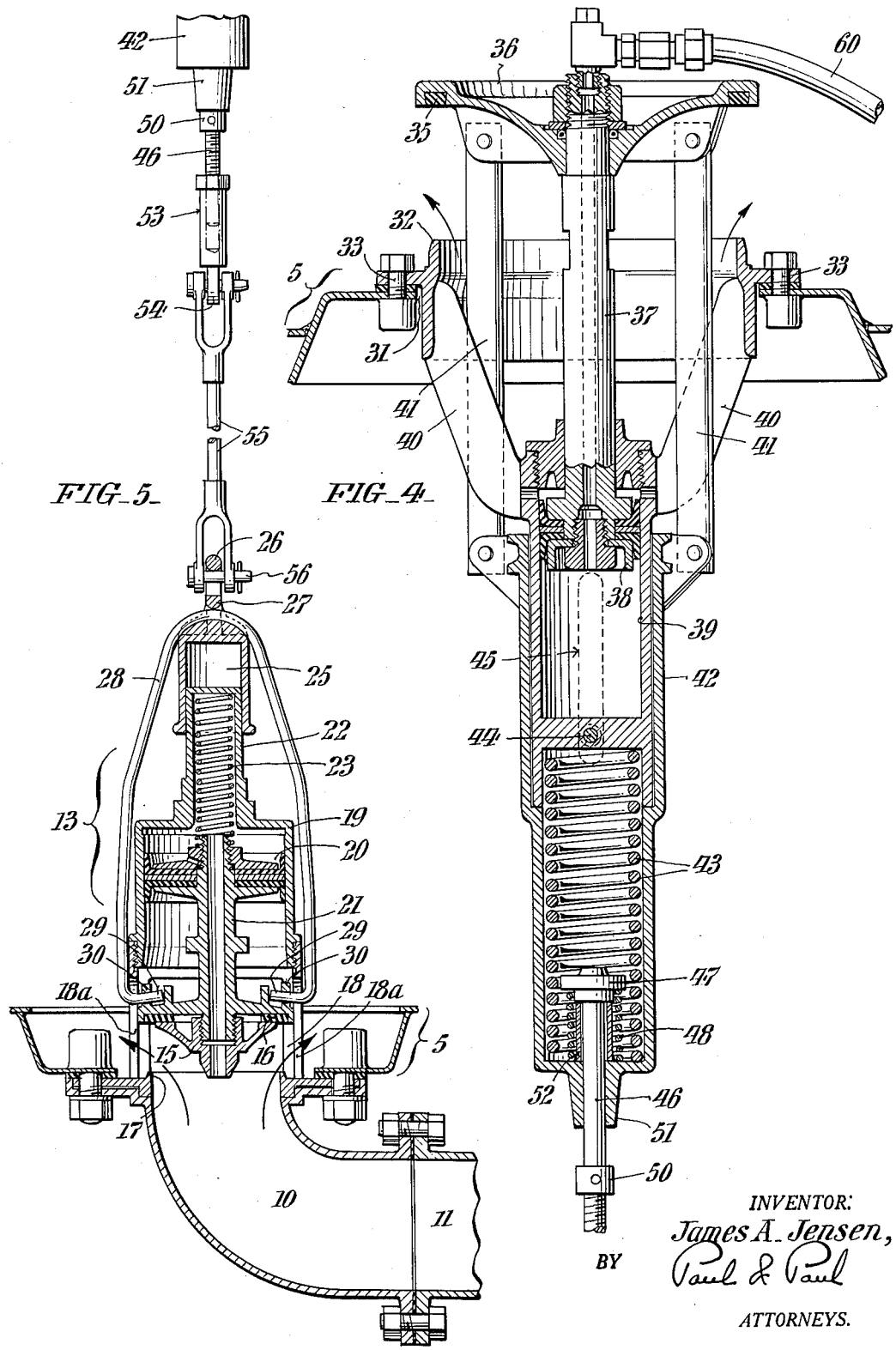

2,730,126

FILLING CONTROL MECHANISM FOR TANK VEHICLES

James Andrew Jensen, Haverford, Pa., assignor to Philadelphia Valve Company, Philadelphia, Pa., a firm Application June 30, 1954, Serial No. 440,522

6 Claims. (Cl. 137—587)

This invention relates to filling control mechanism for tank vehicles commonly employed in bulk transportation of liquid commodities such as gasoline, fuel oils, etc.

Heretfore, it has been the general practice to fill the tanks of vehicles of the kind referred to by inserting overhead filler pipes or hoses leading from a supply source into manhole openings in the tops of the tanks. After the tanks were filled by observation of liquid level markers through the manholes, the attendants shut off the valves in the aforesaid filler pipes. Filling of the tanks in this way was attended by excessive turbulence with high vapor losses through the open manholes, and necessitated climbing of the attendants to the tops of the tanks to open the filler valves and again to close said valves when the liquid level reached the markers. This procedure was not only hazardous and depended upon alertness on the part of the attendants to prevent overfilling, but moreover, was time consuming, particularly in the filling of the individual sections of multi-compartment tanks.

The chief aim of my invention is to overcome the above mentioned drawbacks. This objective is realized in practice, as hereinafter more fully disclosed, through provision of an improved filling control mechanism whereby the tanks or the tank sections of vehicles of the kind referred to can be filled from the bottom to the exact amount of their capacity in a relatively short time with minimum turbulence and evaporation losses, and without necessity for the attendants to climb to the tops of the tanks.

Other objects and advantages will appear from the following detailed description of the attached drawings, wherein:

Fig. 1 is a broken out fragmentary view, partly in side elevation and partly in longitudinal section, of a multi-compartment tank vehicle with filling control mechanism conveniently embodying my invention.

Figs. 2 and 3 are fragmentary views on a larger scale which, taken together, show, in axial section, venting and fill-drain valve means with which each compartment of the tank is provided in accordance with my invention.

Figs. 4 and 5 are views like Figs. 2 and 3 with the venting and fill-drain valve means shown in open position; and Fig. 6 is a fragmentary view in section taken as indicated by the angled arrows VI—VI in Fig. 2.

In these illustrations the tank of the vehicle is comprehensively designated 5, the same being subdivided, in this instance, into several serially-arranged compartments 6 by bulk head partitions 7, and each compartment being provided at the top, as usual, with a manhole 8 for convenience of access to the interior when desired or necessary upon removal of its cover 9.

Bolted to the bottom of each tank compartment 6 is an elbow fitting 10 from which a pipe 11 leads horizontally rearward, and which, at its terminal end, is provided with a hand valve 12. Incorporated with the elbow fitting 10 is a balanced valve 13 which is generally similar to the one disclosed in U. S. Patent No. 1,980,063 granted to me on November 6, 1934, and which includes a closure element 15 whereof the resilient disk 16 normally seals fluid tight against an annular seat member 17 surrounding the liquid fill-drain port at the top of the elbow fitting 10. The closure element 15 is constrained to axial movement vertically by an upward cage-like guide extension 18 of the seat member 17; and screwed into the top of said extension is a cylinder 19 whereof the piston 20 is affixed to the tubular axial stem 21 of said closure element. The cylinder 19 has a hollow diametrically-reduced upward axial prolongation 22 containing a helical compression spring 23 which bears upon the top of the piston 20 to normally keep the closure element 15 pressed down on its seat 17. Slidably engaged over the prolongation 22 of the cylinder 19, is a thimble-like element 25 with an eye 26 at the top thereof; and engaged through an aperture 27 below the opening of said eye is a pendent yoke 28 of stout wire which overreaches the cylinder 19 and which has its inwardly-directed extremities 29 passed through vertical clearance slots 18a in the cage extension 18 and hooked into upstanding diametral ears 30 on the closure element 15. By lift of the yoke 28 in a manner later on explained, the closure element 15 is raised from its seat 17 to open position as in Fig. 5.

Each compartment of the vehicle tank 5 is further provided at the top with a vent opening 31 in axial alignment with the valve 13, into which opening a flange ring 32 is set and secured by bolts 33. The vent opening 31 is normally sealed, as in Fig. 2, by seating of the resilient insert ring gasket 35 of a cover 36 upon the circumferential top edge of the flange ring 32. To a pendent tubular stem 37 of the vent cover 36 is secured a piston 38 which operates in a cylinder 39 rigidly supported within the tank by integral downwardly-extending arm projections 40 of the flange ring 32. Suspended, by hangers 41, from the vent cover 36 is an elongate cup section sleeve 42 which is slidably engaged over the lower end of the cylinder 39. The heavy helical spring, indicated at 43, is in compression between the bottom of the cylinder 39 and the bottom of the hollow of the sleeve 42, and thus serves to normally maintain the cover 36 in tightly closed position. Extending diametrically through the bottom of the cylinder 39 is a safety bolt 44 whereof the ends protrude through vertical clearance slots 45 at opposite sides of the sleeve 42, as best shown in Fig. 6. This bolt 44 is a safety feature to permit servicing of the valves without necessitating removal of the heavy spring 43. Attached to one end of the bolt 44 is a tag T, which may bear the precaution: "Danger—When Servicing Valve Do Not Remove the Safety Bolt—Heavy Spring Inside." If the bolt 44 were not provided and the links 41 were removed, the sleeve 42 would fly off the cylinder 39 and would be likely to cause property damage and/or personal injuries. Extending axially through the bottom of the sleeve is a slide rod 46 having a head 47 at the top end thereof; and in compression between said head and the sleeve bottom is a relatively light helical spring 48. Movement of the slide rod 46 in one direction relative to the sleeve 42 is limited by engagement of a stop collar 50 on the protruding portion thereof with the boss 51 at the bottom of said sleeve as in Fig. 2, and in the other direction by engagement of the head 47 with the top of an upstanding boss 52 within said sleeve at the bottom as in Fig. 4. Adjustable on the threaded lower end of the slide rod 46 is a nut element 53 with a terminal ear 54 which, through a drop link 55, is connected to the eye 26 at the top of the thimble element 25. It is to be particularly noted that the pivot pin at 56 has a loose fit in the opening of the ear 26 of the thimble element 25 so as to allow for contraction and expansion of the tank, and, so as not to interfere with independent action of the springs 23 and 43 to normally keep the valve 13 closed and the vent cover 36 tightly sealed as in Figs. 2 and 3.

Individually connected to the upper ends of the hollow stems 37 of vent covers 36 of the several tank compartments 6 are flexible tubes 60 which, respectively, are joined at 61 to pipes 62 leading to the selector valve 63 of a hydraulic pump 65 at the rear end of the vehicle tank, said pump being manually operable by means of a lever 66 to force pressure fluid, through said tubes and hoses, to the actuating cylinders 39 in the respective tank compartments.

At 68 in Fig. 1, there is shown a supply reservoir containing the liquid commodity which is to be transferred to the tank of the vehicle. Interposed in the outlet pipe 69 of the reservoir 68 is a power driven pump 70 and a metering valve 71 which latter can be adjusted to automatically shut off after a prescribed amount of liquid has been drawn from said reservoir. Leading from the metering valve 71 is a flexible hose 72 having a terminal coupling 73 by which it is selectively connectable to the ends of the drain pipes 11 of the tank compartments of the vehicle. The pump 70 and the metering valve 71 may be of any approved commercially-available type.

*Operation*

When, for example, the rearmost compartment 6 of the vehicle tank is to be loaded, the hose 72 (Fig. 1) is connected to the conduit 11 leading from said compartment, and the selector 63 is then adjusted to connect the corresponding tube 60 to the hand pump 65. With this preparation, the pump 65 is operated to force pressure fluid into the bottom of the cylinder 39 in Fig. 2 through the hose 60 and the axial duct of the piston rod 37. As a result, the vent cover 36 is first raised until the head 47 on the rod 46 encounters the top of the boss 52 at the bottom of the sleeve 42, the light spring 48 yielding to allow this, and the valve 13 remaining closed up to this time. In actual practice with the parts proportioned as illustrated, the vent would be opened to the extent of ¾ inch at this stage. As the operation of the pump 65 is continued, the vent cover 36 is elevated an additional 2¾ inches, and the balanced valve 13 is raised by a corresponding amount to full open position against the pressure of the heavier spring 43, due to the connection of said valve, through the yoke 28, the link 55 and the rod 46, to the sleeve 42. All being now in readiness, the hand valve 12 in the conduit 11 is opened, the meter 71 adjusted to pass the desired amount of gasoline, and the power pump 70 is started to transfer the gasoline from the supply reservoir 68 to the tank compartment. During this operation, venting of the tank compartment takes place freely through the full open vent, the area of which is much longer than the area of the valve port at the bottom of the tank, turbulence of the liquid being very gentle due to filling of the compartment from the bottom, and vaporization losses being therefore held to a minimum. After transfer of the predetermined quantity of gasoline to the tank compartment of the vehicle, the meter 71 functions automatically to stop the power pump 70. The tank compartment being now filled, the hand valve 12 is closed, and the selector 63 on the vehicle adjusted to allow exhausting of the cylinder 39 to take place, with attendant closing of the balanced valve 13 by the spring 43 concurrently with closing of the vent cover 35, and maintenance of the latter thereafter in closed position by the springs 43 and 48. Finally, the hose 72 is disconnected from the conduit 11. The remaining compartments of the vehicle tank are filled, of course, in exactly the same way.

By providing for preliminary opening of the vent cover 36 as above explained, ample venting area is insured in case the balanced valve 13 is opened only part way, say ½ inch. Again, if actuation of the hand pump 65 were stopped with the balanced valve 13 open only to the extent of ½ inch, the vent would be opened 1¼ inches which is ample to permit the liquid commodity to overflow in the event that the power pump 70 fails to shut off after the compartment is filled. Also, if the pump fails to shut off when the balanced valve is fully open or raised through 2¾ inches, the vent will be open 3½ and thus allow overflow of the liquid. If it were not for this safeguard, the tank would burst under the pressure built up therein by continued operation of the power pump 70. Another advantage of my invention is that if the vehicle should turn over in an accident, the pressure due to the head of the liquid on the vent cover 36 would not be sufficient to open the cover against the pressure of the heavy spring 43.

State laws require that the individual compartments of gasoline delivery vehicles to be equipped with ¾ inch vents to admit air for relief of pressure and, in addition, an emergency vent in the form of a fusible plug or spring loaded valve. When my improved construction is employed, this additional or emergency vent is not required since, in case of a fire and consequent build up of pressure within the compartment, the springs 43 and 48 will yield to permit lifting of the cover ¾ of an inch, i. e., until the shoulder 47 on rod 46 contacts the boss 52 in the bottom of the sleeve 42. Accordingly, sufficient vent opening is insured to relieve the excess pressure and meet the state law requirements. It is to be understood that upon arrival of the vehicle at the delivery destination, the vent covers 36 and the valves 13 of the individual tank compartments are opened in the same way as above explained and the liquid allowed to drain from the compartments by gravity under control of the corresponding hand valves 12.

From the foregoing it will be seen that I have provided a relatively simple and foolproof valve construction by which vehicle tanks can be quickly filled from the bottom with minimum evaporation losses, and without requiring the attendant to climb to the top of the tank to open vents as ordinarily necessary heretofore.

Having thus described my invention, I claim:

1. In filling control mechanism for a delivery vehicle tank, a valve having a spring-loaded lift closure element to cooperate with an inlet-drain port at the bottom of the tank; a lift cover for a coaxial vent opening at the top of the tank; actuating means including a vertically-arranged cylinder fixedly supported within the tank in coaxial alignment with the inlet port and the vent opening, and a piston on a pendent tubular rod extension of the vent cover disposed within the cylinder; a suspended cup-section sleeve connected to the vent cover and engaged upwardly about the cylinder; a helical spring within the sleeve in compression between the bottom of the sleeve and the bottom of the cylinder for normally maintaining the vent cover closed; a linkage operatively connecting the sleeve with the closure element of the inlet-drain valve; and manually operable means for admitting pressure fluid into the cylinder by way of the tubular piston rod extension of the vent cover to cause said cover to be raised to open position against the force of the spring and the closure element of the fill-drain valve to be lifted from its seat at the same time through the linkage.

2. The invention according to claim 1, wherein the linkage means has the capacity for limited lost motion so that the vent cover will be opened to a predetermined extent before the lift closure of the fill-drain port is opened.

3. The invention according to claim 1, wherein loose play is normally provided in the linkage when the vent cover is closed to compensate for expansion of the tank so as not to interfere with full closing of the fill-drain valve.

4. In filling control mechanism for a vehicle tank or the like, a valve having a lift closure element to cooperate with a liquid fill-drain port at the bottom of the tank; a lift cover to cooperate with a vent opening at the top of the tank; yielding means for normally maintaining the closure element of the valve and the vent cover in closed position; means within the tank connecting the closure element and the vent cover whereby, upon lifting of the vent cover, the closure element will be raised concurrently from the fill-drain port at the bottom of the tank; and a vertically-arranged pressure fluid cylinder fixedly positioned in the tank for raising the vent cover to open position, said cylinder having the rod of its piston connected to the vent cover; and tubing exteriorly of the tank connecting the cylinder with pump means on the vehicle convenient of access for operation from the ground level to force pressure fluid into the cylinder.

5. The invention according to claim 4, wherein the area of the vent opening is larger than that of the fill-drain port.

6. The invention according to claim 4, wherein the area of the vent opening is larger than that of the fill-drain port, wherein means is provided for limiting the opening movement of the closure element for the fill-drain port; and wherein the yielding connecting means permits continued opening movement of the vent cover after the closure element for the fill-drain is fully raised.

References Cited in the file of this patent

UNITED STATES PATENTS

| | | |
|---|---|---|
| 1,960,831 | Shand | May 29, 1934 |
| 2,004,716 | Thwaits | June 11, 1935 |
| 2,384,628 | Krone | Sept. 11, 1945 |
| 2,430,956 | Scott | Nov. 18, 1947 |